(12) United States Patent
Matsumoto

(10) Patent No.: US 8,833,956 B2
(45) Date of Patent: Sep. 16, 2014

(54) LIGHTING DEVICE, DISPLAY DEVICE AND TELEVISION RECEIVER

(75) Inventor: Shinji Matsumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 334 days.

(21) Appl. No.: 13/512,030

(22) PCT Filed: Oct. 29, 2010

(86) PCT No.: PCT/JP2010/069270
§ 371 (c)(1),
(2), (4) Date: May 25, 2012

(87) PCT Pub. No.: WO2011/074334
PCT Pub. Date: Jun. 23, 2011

(65) Prior Publication Data
US 2012/0287347 A1 Nov. 15, 2012

(30) Foreign Application Priority Data

Dec. 15, 2009 (JP) ................................. 2009-283912

(51) Int. Cl.
*G09F 13/04* (2006.01)
*G02F 1/1335* (2006.01)

(52) U.S. Cl.
CPC .... *G02F 1/133603* (2013.01); *G02F 1/133611* (2013.01); *G02F 1/133605* (2013.01)
USPC ........... 362/97.1; 349/67; 362/97.3; 362/247; 362/296.01; 362/297; 362/346

(58) Field of Classification Search
USPC .................. 349/67; 362/97.1, 97.3, 235, 247, 362/296.01, 297, 346, 623, 624
See application file for complete search history.

(56) References Cited

U.S. PATENT DOCUMENTS

| | | | |
|---|---|---|---|
| 7,641,373 B2 * | 1/2010 | Sugawara et al. | 362/560 |
| 2006/0044830 A1 | 3/2006 | Inoue et al. | |
| 2006/0109643 A1 | 5/2006 | Chang | |
| 2007/0058390 A1 | 3/2007 | Sugawara et al. | |
| 2010/0296270 A1 | 11/2010 | Gomi et al. | |

FOREIGN PATENT DOCUMENTS

| | | |
|---|---|---|
| EP | 2 426 395 A1 | 3/2012 |
| JP | 2006-146126 A | 6/2006 |
| JP | 2007-080702 A | 3/2007 |
| JP | 2007-234639 A | 9/2007 |

(Continued)

OTHER PUBLICATIONS

Official Communication issued in International Patent Application No. PCT/JP2010/069270, mailed on Dec. 28, 2010.

*Primary Examiner* — Stephen F Husar
(74) *Attorney, Agent, or Firm* — Keating & Bennett, LLP

(57) ABSTRACT

A lighting device includes a light source, a chassis housing the light source, and a reflection sheet provided in the chassis. The reflection sheet includes a bottom portion and a sloped portion. The bottom portion extends along a surface of the bottom plate and the sloped portion extends from a peripheral edge of the bottom portion. The sheet sloped portion is inclined with respect to the sheet bottom portion toward a light exit side of the lighting device. The reflection sheet includes a border portion and an adjacent portion. The border portion includes a borderline between the bottom portion and the sloped portion and an area along the borderline, and the adjacent portion is provided close to the border portion and on a side far away from the borderline. Light reflectance is higher in the border portion than in the adjacent portion on the surface of the reflection sheet.

13 Claims, 11 Drawing Sheets

(56) References Cited

FOREIGN PATENT DOCUMENTS

| | | |
|---|---|---|
| JP | 2008-300277 A | 12/2008 |
| JP | 2009-266625 A | 11/2009 |
| WO | 2004/031647 A1 | 4/2004 |
| WO | 2009/093583 A1 | 7/2009 |

* cited by examiner

FIG.1
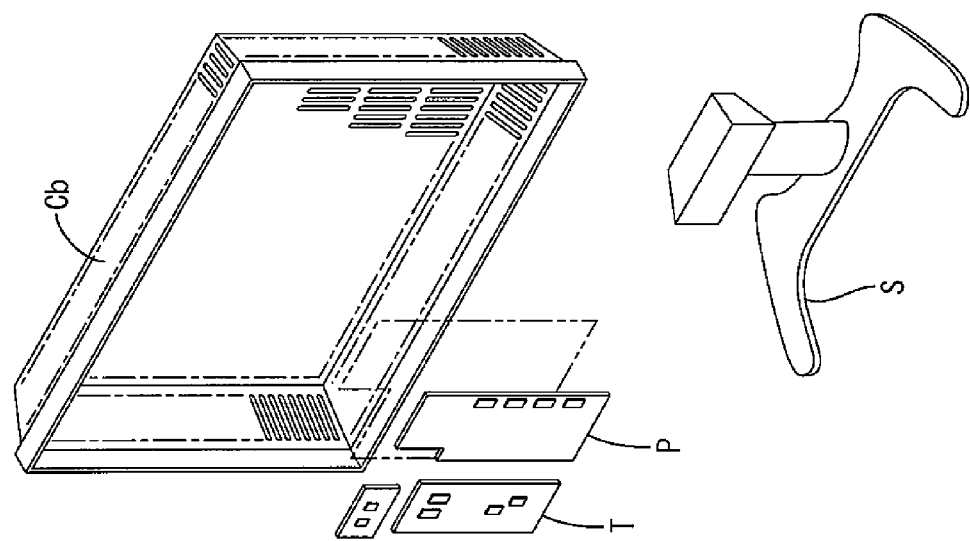
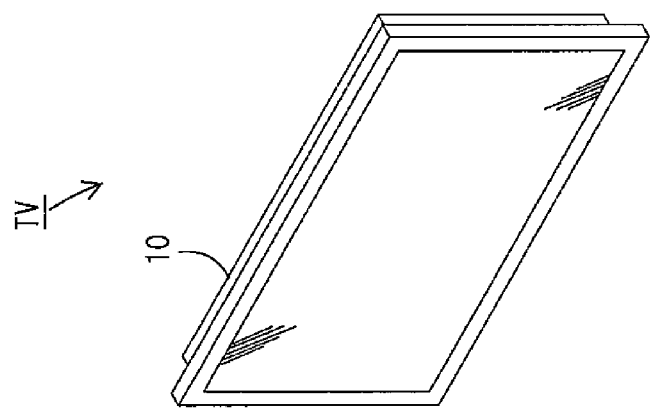
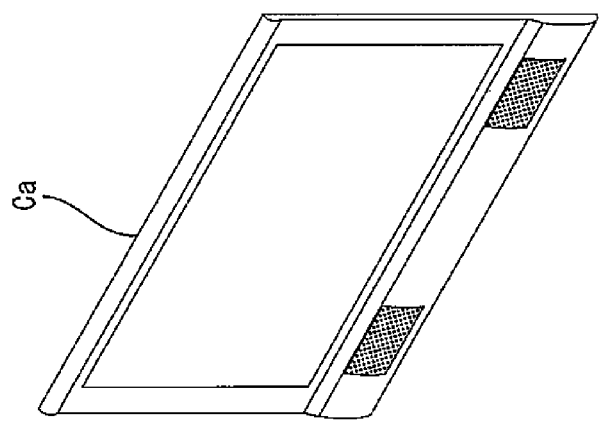

LIGHTING DEVICE, DISPLAY DEVICE AND TELEVISION RECEIVER

TECHNICAL FIELD

The present invention relates to a lighting device, a display device and a television receiver.

BACKGROUND ART

For example, a liquid crystal panel used for a liquid crystal display device such as a liquid crystal television does not emit light, and thus a backlight unit is required as a separate lighting device. The backlight unit is known, which is arranged behind the liquid crystal panel (on aside opposite to a display surface side). The backlight unit includes a chassis having an opening on its surface side facing the liquid crystal panel, a plurality of light sources (such as cold cathode tubes and LEDs) arranged on an inner surface of a bottom plate of the chassis and a reflection sheet that is provided in the chassis and reflects light from the light sources toward the liquid crystal panel. Patent Document 1 discloses one example of such a backlight unit.
[Patent Document 1] Japanese Unexamined Patent Publication No. 2006-146126

Problem to be Solved by the Invention

The reflection sheet provided in the backlight unit includes a sheet bottom portion that is provided along a bottom plate of the chassis and a sheet sloped portion that extends from a peripheral end portion of the sheet bottom portion and sloped from the sheet bottom portion toward the liquid crystal panel. Specifically, the sheet sloped portion is sloped so as to be closer to the liquid crystal panel as is closer to the outer side of the chassis. The sheet slope portion directs the reflected light toward an inner side (a middle portion of the liquid crystal display device).

In such a backlight unit, if the light sources are arranged on the bottom plate such that a light axis of light from the light source is directed toward the liquid crystal panel (if the light sources are arranged on the sheet bottom portion of the reflection sheet), a portion of the reflection sheet that is adjacent to a border between the sheet bottom portion and the sheet sloped portion (a peripheral end portion of the sheet bottom portion and a basal end portion of the sheet sloped portion) is likely to be a dark portion compared to other portions.

Such a problem may occur due to following two reasons.

A first reason is as follows. The portion of the reflection sheet adjacent to the border corresponds to the peripheral end portion of the sheet bottom portion. Therefore, a distance from the light source to the portion adjacent to the border is greater than that from the light source to the middle portion of the sheet bottom portion. Accordingly, the amount of light reaching from the light source is relatively small in the portion adjacent to the border compared to that in the middle portion of the sheet bottom portion.

A second reason is as follows. Generally, in a light source having strong directivity, an amount of light exiting therefrom varies according to an inclination angle of a direction in which the light exits with respect to a light axis and the amount of exiting light decreases as the inclination angle increases. Specifically, in the above example, comparing the amount of light in the basal end portion of the sheet sloped portion and that in the distal end portion of the sheet sloped portion, the inclination angle with respect to the light axis of the light from the light source increases as is closer to the basal end portion of the sheet sloped portion. Accordingly, the amount of light reaching the basal end portion is relatively small.

Due to the above two reasons, the amount of light is relatively small at the portion in adjacent to the border between the sheet bottom portion and the sheet sloped portion of the reflection sheet. Accordingly, the amount of light that is reflected toward the liquid crystal panel decreases. Therefore, in the backlight unit, a dark portion that is darker than other portions is formed along the border and this may cause unevenness brightness.

DISCLOSURE OF THE PRESENT INVENTION

The present technology was accomplished in view of the above circumstances. It is an object of the present technology to provide a lighting device in which uneven brightness is less likely to occur. It is another object to provide a display device and a television receiver including such a lighting device.

Means for Solving the Problem

To solve the above problem, a lighting device source unit of the present technology includes a light source, a chassis including a bottom plate and housing the light source on the bottom plate, and a reflection sheet provided on an inner surface side of the chassis and configured to reflect light from the light source. The reflection sheet includes a sheet bottom portion and a sheet sloped portion, and the sheet bottom portion extends along a surface of the bottom plate and the sheet sloped portion extends from a peripheral edge of the sheet bottom portion, and the sheet sloped portion is inclined with respect to the sheet bottom portion toward a light exit side of the lighting device. The reflection sheet has a surface that is close to the light source and the reflection sheet includes a border portion and an adjacent portion. The border portion includes a borderline between the sheet bottom portion and the sheet sloped portion and an area along the borderline, and the adjacent portion is provided close to the border portion and on a side far away from the borderline. Light reflectance is higher in the border portion than in the adjacent portion on the surface of the reflection sheet.

In the present technology, the light reflectance is higher in the border portion that is provided along the borderline between the sheet bottom portion and the sheet sloped portion than in the adjacent portions that is provided in adjacent to the border portion. The high light reflectance increases the amount of reflected light and this improves brightness. With such a configuration, brightness of the border portion receiving less amount of light exited from the light source (the portion that is likely to have lower brightness with the constant light reflectance) is less likely to be lower than the brightness of the adjacent portions that are provided in adjacent to the border portion and on a side away from the borderline, and the border portion is less likely to be recognized as a dark portion.

In the above configuration, the light reflectance of the surface of the reflection sheet close to the light source may reduce as is farther away from the borderline. With this configuration, brightness does not change abruptly between the border portion and the adjacent portions.

The lighting device may further include a light reflecting portion provided in the adjacent portion and having light reflectance lower than light reflectance of the reflection sheet. With this configuration, the light reflectance of the adjacent portions is lower than light reflectance of the border portion (that is equal to the light reflectance of the reflection sheet).

That is, the light reflectance of the border portion is higher than that of the adjacent portions.

To achieve a configuration that the light reflectance of the border portion is higher than that of the adjacent portions, the reflection sheet having constant light reflectance is prepared and a light reflecting portion having light reflectance higher than the reflection sheet maybe formed on the border portion. However, the reflection sheet generally has high light reflectance to improve light use efficiency. Therefore, it is difficult to set the light reflectance of only the border portion on the reflection sheet that originally has high light reflectance to be higher than the adjacent portions. In the present technology, the light reflecting portion having light reflectance lower than the reflection sheet is formed on the adjacent portions to lower the light reflectance of the adjacent portions. This easily achieves a configuration that the light reflectance is higher in the border portion than in the adjacent portions.

The light reflecting portion may be configured with a dot pattern. Therefore, a pattern of each dot (such as an area and arrangement intervals) is varied to easily control the light reflectance of the light reflecting portion (eventually the adjacent portions).

The border between the sheet bottom portion and the sheet sloped portion may be formed in a non-linear shape in a plan view. Accordingly, if the area along the borderline (the border portion) becomes a dark portion, the dark portion has a non-linear shape in a plan view. Compared to the linear dark portion, in a configuration that the dark portion is formed in a non-linear shape, the border between the dark portion and its surrounding portions is unclear and uneven brightness is less likely to be caused. The phrase "the borderline is formed in a non-linear shape" means that the borderline between the sheet bottom portion and the sheet sloped portion is not formed in a linear shape over its entire length. In other words, the borderline may partially include a linear portion.

The border between the sheet bottom portion and the sheet sloped portion may be formed in a rectangular waveform in a plan view. The borderline formed in a rectangular waveform is easily formed compared to the one formed in other non-linear shapes (for example, a curved line shaped in a sinusoidal waveform). To form the borderline in a curved line, the sloped surface of the sheet sloped portion is also required to be formed in a curved surface and this may cause uneven brightness. With the configuration that the borderline is formed in a rectangular waveform, the surface of the sheet sloped portion includes only plane surfaces and this may not cause uneven brightness.

The sheet bottom portion may be formed in substantially a rectangular shape in a plan view and have four sides. The sheet sloped portion may include a plurality of sheet sloped portions, and each of the sheet sloped portions may extend from each of the four sides.

The light source may be a light emitting diode. This lowers consumption power.

The lighting device may further include a diffuser lens provided to cover the light source and configured to diffuse light from the light source. With this configuration, light from the light source is diffused by the diffuser lens and arrangement intervals between the light sources is increased (the number of light sources is reduced) and even brightness is achieved.

The light source may include a plurality of light sources and the light sources may be arranged along the bottom plate of the chassis in a matrix.

Next, to solve the above problem, a display device of the present invention may include the above lighting device and a display panel configured to provide display using light from the lighting device.

The display panel may be a liquid crystal panel. The display device as a liquid crystal display device has a variety of applications, such as a television display or a personal-computer display. Particularly, it is suitable for a large screen display.

Next, to solve the above problem, a television receiver of the present invention may include the above display device.

Advantageous Effect of the Invention

The present invention provides a lighting device in which uneven brightness is less likely to occur and provides a display device and a television receiver including such a lighting device.

BRIEF DESCRIPTION OF THE DRAWINGS

FIG. 1 is an exploded perspective view illustrating a general configuration of a television receiver according to a first embodiment of the present invention;

BEST MODE FOR CARRYING OUT THE INVENTION

<First Embodiment>

A first embodiment of the present invention will be described with reference to FIGS. 1 to 10. In the present embodiment, a liquid crystal display device 10 will be explained. An X axis, a Y-axis and a Z-axis are described in a part of the drawings, and a direction of each axial direction corresponds to a direction described in each drawing. An upper side in FIGS. 4 and 5 corresponds to a front-surface side and a lower side in FIGS. 4 and 5 corresponds to a rear-surface side.

Figure 2:
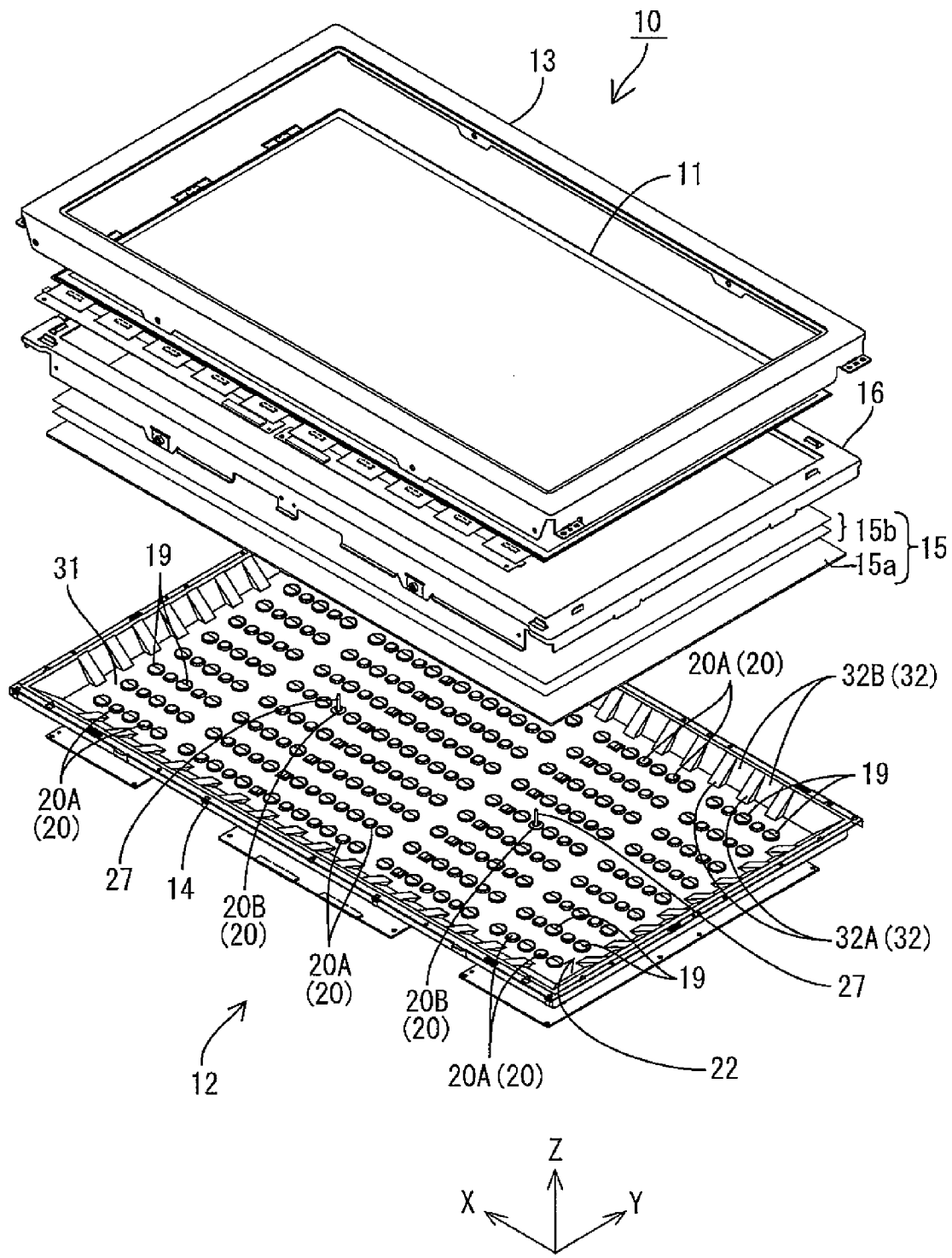
FIG. 2 is an exploded perspective view illustrating a general configuration of a liquid crystal display device included in the television receiver of FIG. 1.

As illustrated in FIG. 1, a television receiver TV of the present embodiment includes the liquid crystal display device 10, front and rear cabinets Ca, Cb which house the liquid crystal display device 10 therebetween, a power source P, a tuner T and a stand S. An entire shape of the liquid crystal display device (display device) 10 is a landscape rectangular. The liquid crystal display device 10 is housed in a vertical position. As illustrated in FIG. 2, the liquid crystal display device 10 includes a liquid crystal panel 11 as a display panel, and a backlight device (lighting device) 12 as an external light source. The liquid crystal panel 11 and the backlight device 12 are integrally held by a frame shaped bezel 13 and the like. In the present embodiment, a display size is 42 inches and an aspect ration is 16:9.

Next, the liquid crystal panel 11 and the backlight device 12 included in the liquid crystal display device 10 will be described. The liquid crystal panel (display panel) 11 is formed in a rectangular shape with a plan view and is configured such that a pair of glass substrates is bonded together with a predetermined gap therebetween and liquid crystal is sealed between the glass substrates. On one of the glass substrates, switching components (for example, TFTs) connected to source lines and gate lines which are perpendicular to each other, pixel electrodes connected to the switching components, and an alignment film and the like are provided. On the other substrate, color filters having color sections such as R (red), G (green) and B (blue) color sections arranged in a predetermined pattern, counter electrodes, and an alignment film and the like are provided. Polarizing plates 11A, 11B are attached to outer surfaces of the substrates (see FIG. 7).

The backlight device 12 will be explained in detail. The backlight device 12 is a direct-type backlight device in which a plurality of LED units U are provided directly below a panel surface (a display surface) of the liquid crystal panel 11. As illustrated in FIG. 2, the backlight device 12 includes a chassis 14, an optical sheet set 15 (a diffuser 15a, and a plurality of optical sheets 15b which is provided between the diffuser 15a and the liquid crystal panel 11), a frame 16, and a chassis reflection sheet 22. The chassis 14 has a substantially box-shape and has an opening 14b on the light exit side (on the liquid crystal panel 11 side). The optical sheet set 15 is provided so as to cover the opening 14b of the chassis 14. The frame 16 provided along an outer edge of the chassis 14 holds an outer edge of the optical sheet set 15 such that the outer edge is sandwiched between the frame 16 and the chassis 14. The chassis reflection sheet 22 reflects light in the chassis 14 toward the optical member 15 side. Furthermore, an LED unit U (light source unit) including LEDs 17 (light emitting diodes) that are a light source is arranged in the chassis 14.

A plurality of LED units U (light source units) including LEDs 17 (light emitting diodes) as the light sources are housed in the chassis 14. Holding members 20 are provided in the chassis. The holding members 20 hold the LED units U to the chassis 14. In the backlight device 12, a light exit side of the backlight device 12 is a side closer to the optical member 15 than the LED unit U (front surface side). In the following, each component of the backlight device 12 will be explained.

Figure 3:
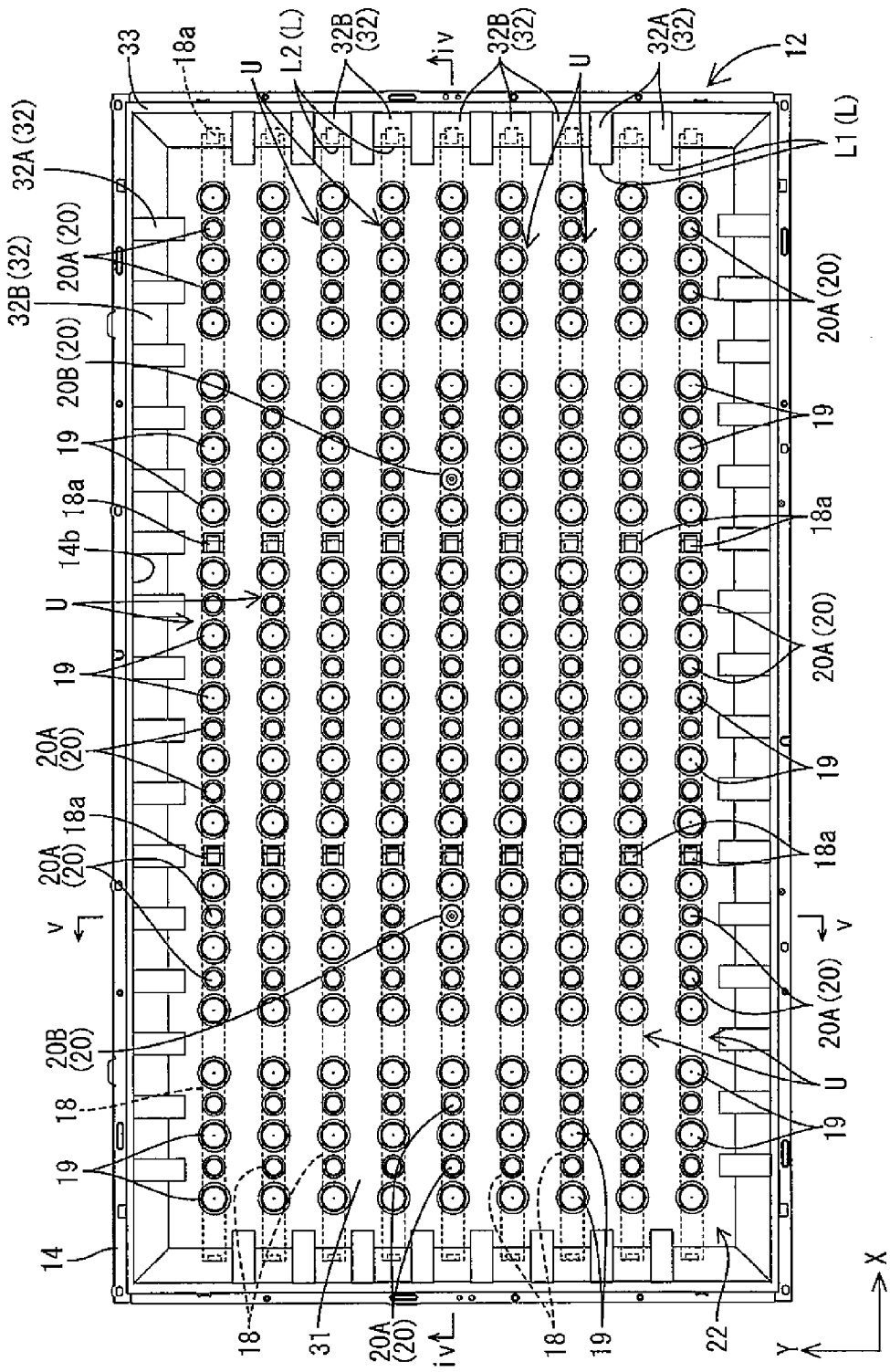
FIG. 3 is a plan view illustrating a backlight unit included in the liquid crystal display device of FIG. 2.
Figure 4:
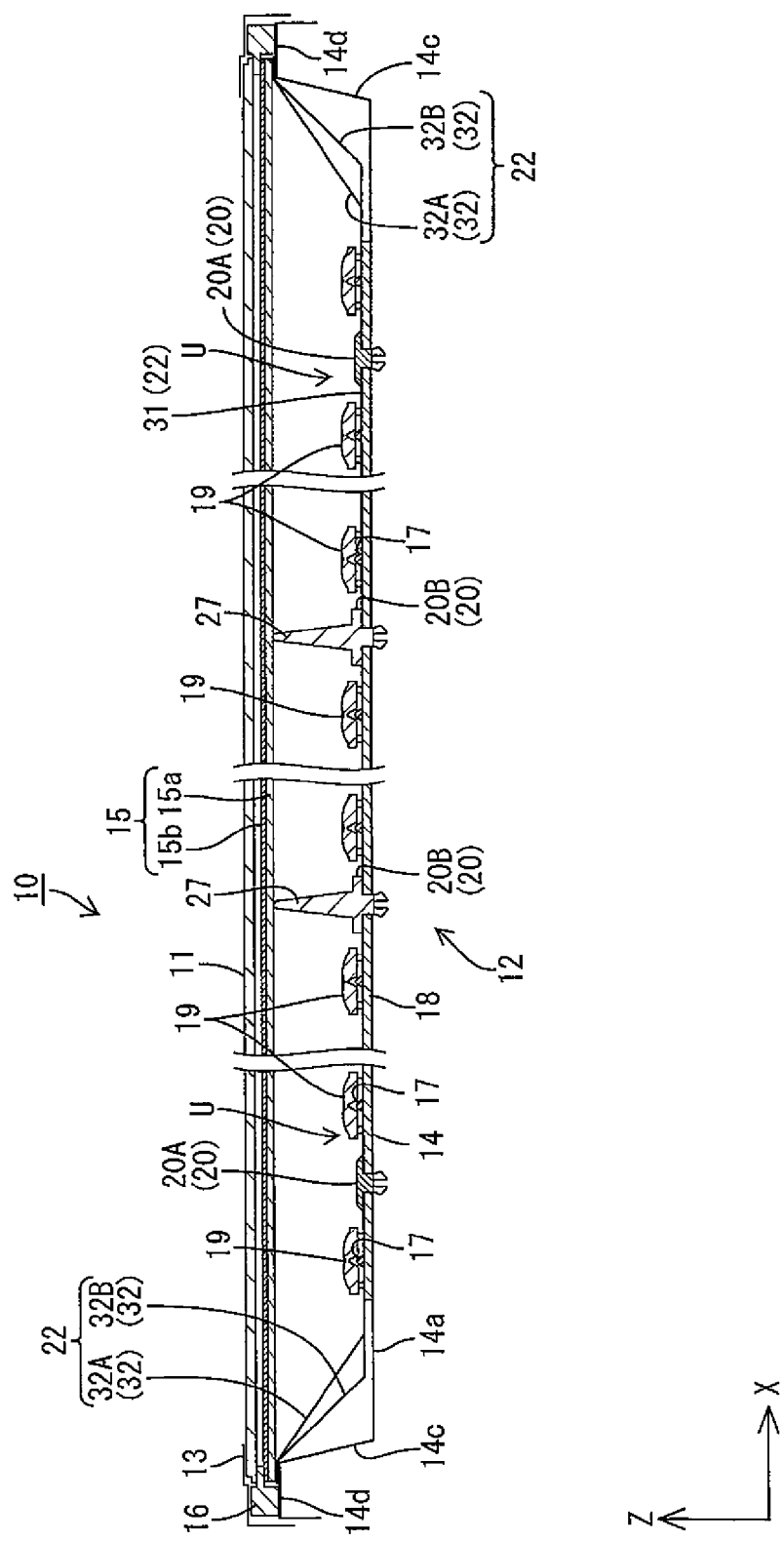
FIG. 4 is a cross-sectional view of the liquid crystal display device of FIG. 2 taken along a long-side direction thereof and illustrating a cross-sectional configuration (a cross-sectional view taken along a iv-iv line in FIG. 3)
Figure 5:
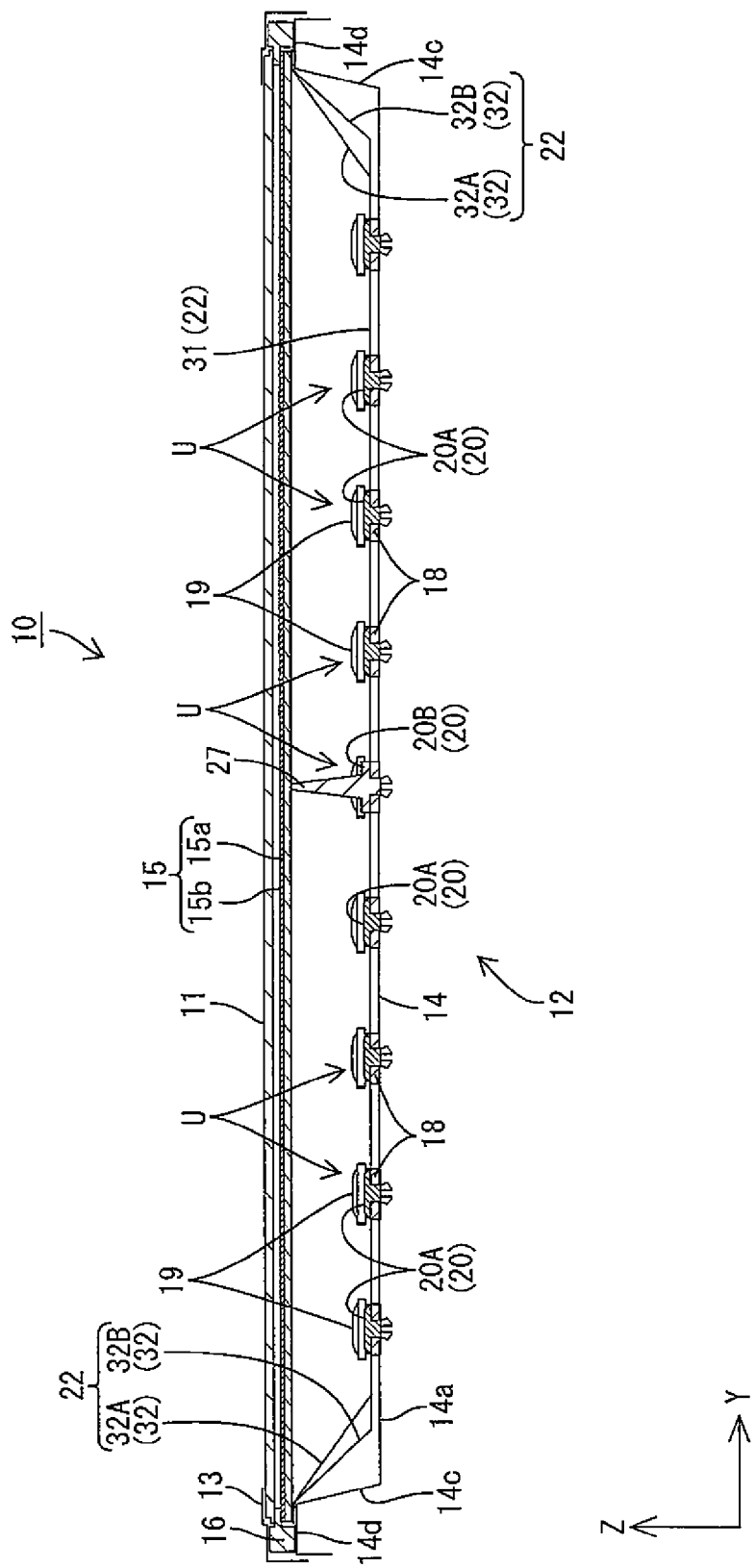
FIG. 5 is a cross-sectional view of the liquid crystal display device of FIG. 2 taken along a short-side direction thereof and illustrating a cross-sectional configuration (a cross-sectional view taken along a v-v line in FIG. 3)

The chassis 14 is made of metal. As illustrated in FIGS. 3 to 5, the chassis 14 includes a rectangular bottom plate 14a like the liquid crystal panel 11, side plates 14c each of which rises from an outer edge of the corresponding side of the bottom plate 14a, and a receiving plate 14d outwardly extending from a rising edge of each of the side plates 14c. An entire shape of the chassis 14 is a substantially shallow box shape (shallow plate shape) opened to the front surface side. A long side of the chassis 14 matches an X-axis direction (a horizontal direction) and a short side thereof matches a Y-axis direction (a vertical direction). The frame 16 and an optical member 15 that will be described later can be placed on the receiving plate 14d of the chassis 14 from the front-surface side. The frame 16 is fixed to each receiving plate 14d by screws.

As illustrated in FIG. 2, the optical member 15 is formed in a rectangular landscape with a plan view like the liquid crystal panel 11 and the chassis 14. As illustrated in FIGS. 4 and 5, the outer edge of the optical member 15 is placed on the receiving plate 14d so as to cover the opening 14b of the chassis 14 and provided between the liquid crystal panel 11 and the LED unit U.

The optical member 15 includes a diffuser 15a and an optical sheet 15b. The diffuser 15a is provided on the rear-surface side (the LED unit U side, a side opposite from the light exit side) and the optical sheet 15b is provided on the front-surface side (the liquid crystal panel 11 side, the light exit side). The diffuser 15a includes a base member having a thickness and made of a substantially transparent synthetic resin and light scattering particles dispersed in the base member. The diffuser 15a has a function for diffusing light that transmitting therethrough. The optical sheet 15b is formed in a sheet having a thickness smaller than the diffuser 15a. A specific optical sheet 15b may include a diffuser sheet, a lens sheet, a reflecting type polarizing sheet, and any one of them may be selected to be used.

Figure 7:
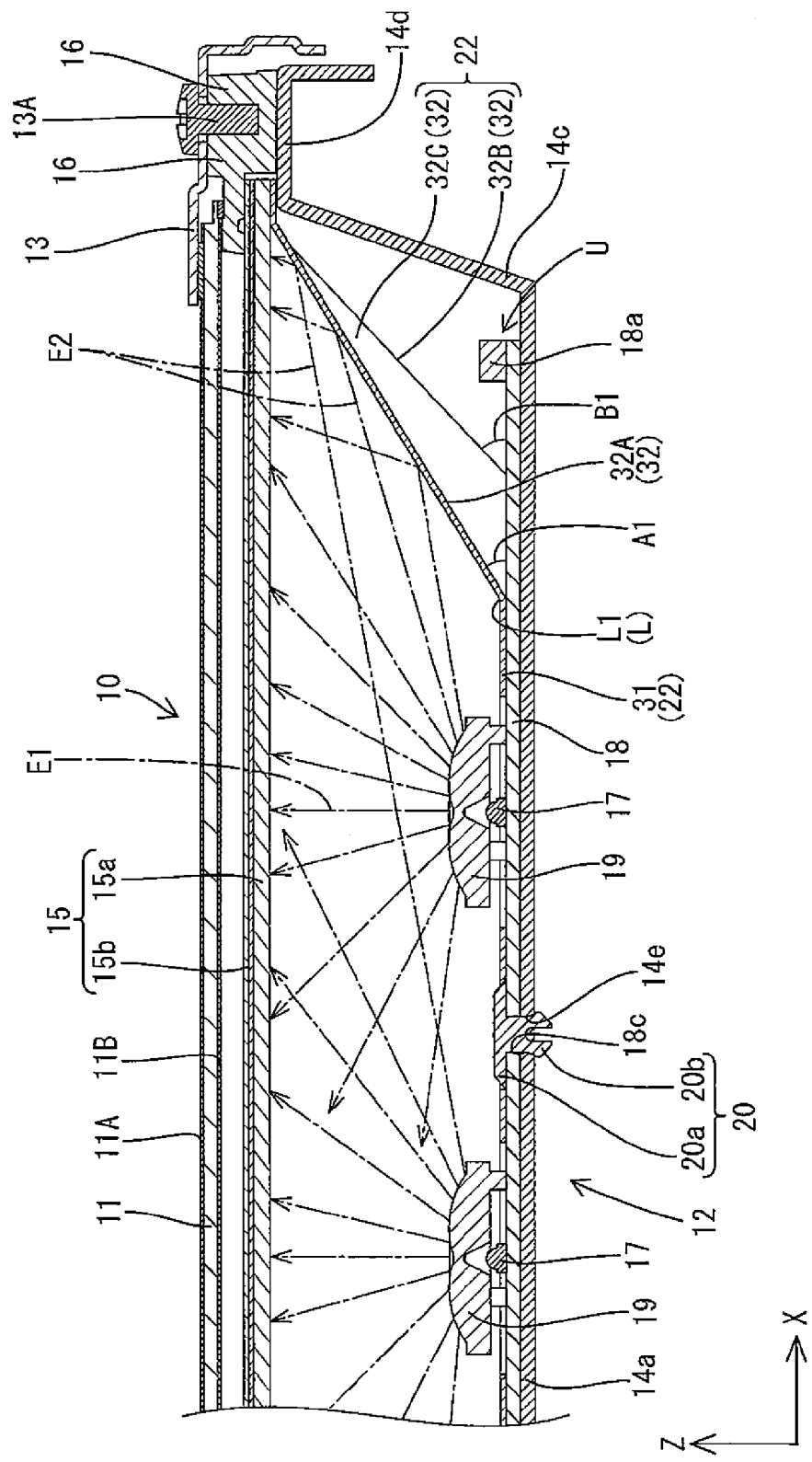
FIG. 7 is an enlarged cross-sectional view illustrating rays of light exiting from the LED.
Figure 8:
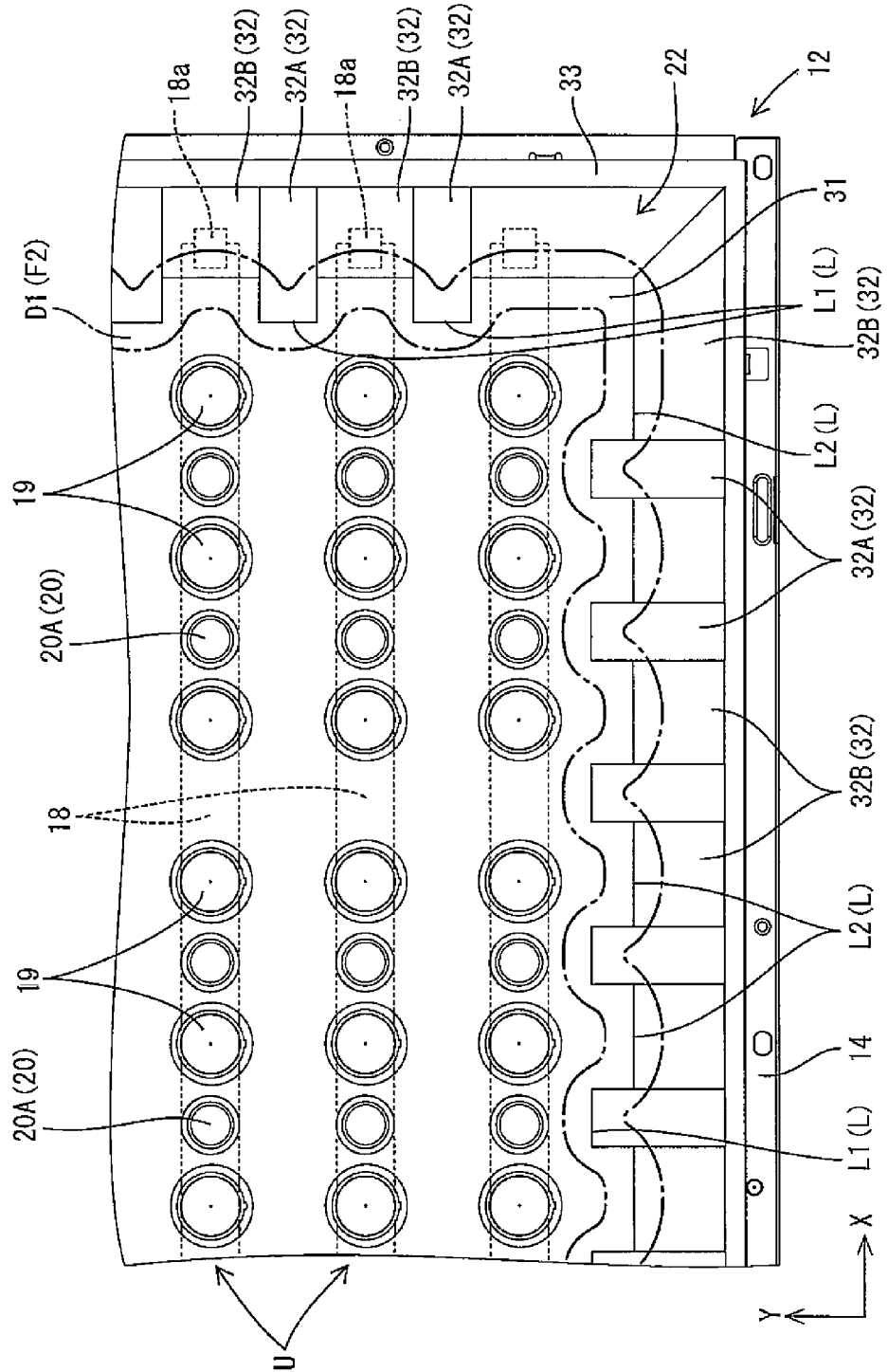
FIG. 8 is an enlarged view illustrating a peripheral part of a chassis reflection sheet in FIG. 3.

As illustrated in FIG. 2, the frame 16 is formed in a frame shape along an outer peripheral part of the liquid crystal panel 11 and the optical member 15. The frame 16 and each receiving plate 14d hold the outer peripheral part of the optical member 15 therebetween (FIGS. 4 and 7). The frame 16 receives a rear surface of the outer peripheral part of the liquid crystal panel 11. The bezel 13 is fixed onto a front surface of the frame 16 by a screw 13A. Accordingly, the bezel 13 and the frame 16 hold the outer peripheral part of the liquid crystal panel 11 therebetween.

Figure 6:
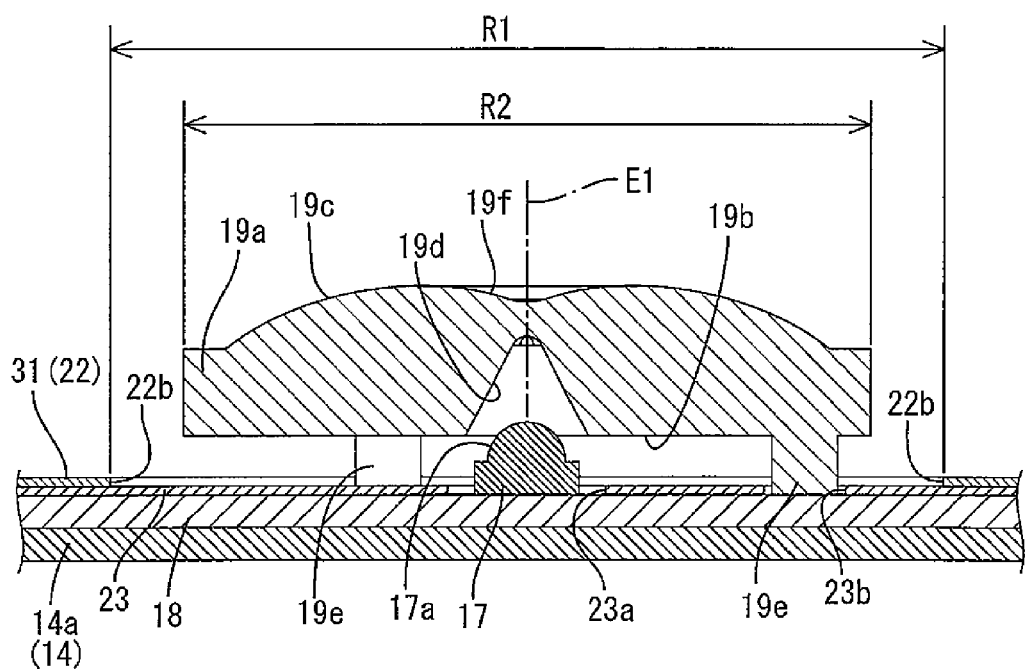
FIG. 6 is an enlarged cross-sectional view illustrating a portion of the liquid crystal display device that is close to an LED in FIG. 4.

The LED unit U (the light source unit) will be explained in detail. As illustrated in FIG. 3, the LED unit U is formed in an elongated shape extending along the X-axis direction and a plurality sets of LED units U (nine sets in the present embodiment) are arranged in the Y-axis direction. As illustrated in FIGS. 6 and 7, the LED unit U mainly includes a LED board 18 on which an LED 17 is mounted. The LED unit U includes a diffuser lens 19 and a board reflection sheet 23. The diffuser lens 19 is provided on a portion of the LED board 18 corresponding to the LED 17. Components of the LED unit U will be explained in detail.

The LED 17 is a point light source formed in a point-like shape in a plan view. A plurality of LEDs 17 (seventeen in the present embodiment) are arranged along the long-side direction (the X-axis direction) of the LED board 18. The LED 17 is configured by sealing a LED chip with a resin material onto a base board. The LED chip that is mounted on the base board has one main light emission wavelength and specifically, the LED chip that emits a single color of blue is used. On the other hand, a fluorescent material is dispersed in the resin material that seals the LED chip therein. The fluorescent material converts blue light emitted from the LED chip into white light. This enables the LED 17 to emit white light.

As illustrated in FIG. 6, the LED 17 is a top-type LED that has a light emitting surface 17a (a light exit surface) on a surface opposite from the mounting surface that is to be mounted to the LED board 18 (a surface that faces the front-surface side). A light axis E1 of light emitted from the LED 17 substantially matches the Z-axis direction (a direction perpendicular to a main plate surface of the liquid crystal panel 11 and the optical member 15). Light emitted from the LED 17 radiates three-dimensionally around the light axis E1 within a specified angle range and the directivity thereof is higher than that of cold cathode tubes. Namely, angle distributions of the LED 17 shows a tendency that the emission intensity of the LED 17 is significantly high along the light axis E1 and sharply decreases as the angle to the light axis LA increases.

As illustrated in FIG. 3, the LED board 18 is formed in a base plate having a rectangular shape with a plan view and extending in the X-axis direction, and the LED board 18 is housed in the chassis 14 with extending along the bottom plate 14a such that a long-side direction of the LED board matches the X-axis direction and a short-side direction thereof matches the Y-axis direction. The LED 17 is arranged on the bottom plate 14a of the chassis 14. A connector portion 18a is provided on each end portion of the LED board 18 in the long-side direction.

The diffuser lens 19 is made of a synthetic resin (such as polycarbonate or acrylic) that is substantially transparent (capable of high light transmission) and has refraction index higher than air. As illustrated in FIG. 6, the diffuser lens 19 has a specified thickness and has a lens body 19a formed in substantially a circular shape with plan view and the diffuser lens 19 is mounted to the LED board 18 so as to cover each LED 17 from the front-surface side individually and overlap each LED 17 in a plan view. Leg portions 19e are provided on a lower surface 19b of the diffuser lens 19 and project from a peripheral end portion of the lower surface 19b.

Three leg portions 19e are provided on the lower surface 19b along a peripheral end portion of the diffuser lens 19 at equal intervals with a plan view (approximately 120 degree intervals). The leg portions 19e are fixed to the surface of the LED board 18 by an adhesive or a thermosetting resin, for example. A light entrance recess 19d is formed on a portion of the lower surface (a surface facing the LED 17 and the LED board 18) of the diffuser lens 19 overlapping the LED 17 with a plan view. The light entrance recess 19d is recessed upwardly and formed in substantially a circular cone. Light from the LED 17 enters the light entrance recess 19d. Surface roughening such as texturing is applied to the lower surface of the diffuser lens 19.

A recess 19f is formed in a middle portion (a portion overlapping the LED 17 with a plan view) of an upper surface (a surface facing the diffuser 15a) of the diffuser lens 19. The recess 18f is recessed downwardly. Accordingly, continuous two gentle arcs form a light exit surface 19c. Light emitted from the LED 17 is refracted at a border between an air layer and the light entrance recess 19d and between the light exit surface 19c and the air layer to be diffused in a planar manner. Thus, the light is irradiated from the light exit surface 19c toward the diffuse 15a over a wide angle area. Accordingly, the diffuser lens 19 diffuses the light emitted from the light emitting surface 17a of the LED 17 having strong directivity and emits the light therefrom. The directivity of the light emitted from the LED 17 is lowered via the diffuser lens 19. Therefore, even if a distance between the adjacent LEDs 17 is large, the space therebetween is less likely to be recognized as a dark portion and the number of LEDs 17 can be decreased.

The amount of light from the LED 17 is extremely large in a portion of the light exit surface 19c that overlaps the LED 17 with a plan view compared to other portions, and therefore brightness is locally high in the portion of the light exit surface 19c. The recess 19f is formed in the middle portion of the upper surface of the diffuser lens 19 and accordingly, most of the light from the LED 17 is refracted at a wide angle to be exited and a part of the light from the LED 17 is reflected toward the LED board 18. Thus, the brightness in the portion of the light exit surface 19c overlapping the LED 17 is less likely to be locally high and uneven brightness is less likely to occur.

A board reflection sheet 23 is provided on each LED board 18 and the board reflection sheet 23 has a size capable of covering each LED board 18. The board reflection sheet 23 is made of a synthetic resin and has a surface having white color that provides excellent light reflectivity. The board reflection sheet 23 extends along the LED board 18 and has a substantially same outer shape as the LED board 18 to be formed in a rectangular shape in a plan view. As illustrated in FIG. 6, the board reflection sheet 23 is arranged to cover the front side surface of the LED board 18 that is the mounting surface where the LEDs 17 are mounted so as to cover almost its entire surface.

The board reflection sheet 23 is provided between the diffuser lens 19 and the LED board 18. Specifically, the board reflection sheet 23 is provided in a space of a lens fitting hole 22b formed in the chassis reflection sheet 22 that is overlapped with the board reflection sheet 23 in a plan view. Accordingly, light that enters the lens fitting hole 22b is reflected by the board reflection sheet 23 to the diffuser lens 19. This improves light use efficiency and improves brightness. In other words, sufficient brightness is obtained with decreasing the number of LEDs 17 and lowering a cost.

As illustrated in FIG. 6, an LED fitting hole 23a is formed in a portion of the board reflection sheet 23 that overlaps each LED 17 on the LED board 18 in a plan view. Each LED 17 is fitted in the LED fitting hole 23a. A diameter of each LED fitting hole 23a is greater than that of the LED 17 and smaller than that of the lens fitting hole 22b of the chassis reflection sheet 22 and the diffuser lens 19.

Leg portion fitting holes 23b are formed in the board reflection sheet 23 corresponding to the leg portions 19e of each diffuser lens 19. The leg portion fitting holes 23b are through holes and the leg portion 19e is fitted through each leg portion fitting hole 23b. Each leg portion fitting hole 23b is formed in substantially a circular shape with a plan view so as to fit to an outer shape of the leg portion 19e. A diameter of each leg portion fitting hole 23b is slightly greater than that of the leg portion 19e.

As illustrated in FIG. 3, a plurality of LED units U including the above components are arranged to be parallel to each other in the X-axis direction and in the Y-axis direction within the chassis 14 such that they are justified in the long-side direction and in the short-side direction. Namely, the LED units U (the LED boards 18) are arranged in rows and columns (in a matrix) within the chassis 14. The X-axis direction (the long-side direction of the chassis 14 and the LED board 18) corresponds to the row direction and the Y-axis direction (the short-side direction of the chassis 14 and the LED board 18) corresponds to the column direction. The LEDs 17 are arranged in rows and columns in the X-axis direction and in the Y-axis direction (along the bottom plate 14a of the chassis 14).

Specifically, three LED units U are arranged parallel to each other in the X-axis direction within the chassis 14 and nine LED units are arranged parallel to each other in the Y-axis direction and total of twenty seven LED units U are arranged parallel to each other in the chassis 14. In the present embodiment, two kinds of LED boards 18 having a different long-side dimension and the different number of LEDs 17 mounted thereon are used for the LED unit U. Specifically, the LED board 18 includes a six LEDs mounted-type and a five LEDs mounted-type. The six LEDs mounted-type LED board 18 has six LEDs mounted thereon and has a relatively great long-side dimension. The five LEDs mounted-type LED board 18 has five LEDs mounted thereon and has a relatively small long-side dimension. The six LEDs mounted-type LED board 18 is arranged on each end portion of the chassis 14 in the X-axis direction and the five LEDs mounted-type LED board 18 is arranged in a middle portion of the chassis 14 in the X-axis direction.

The LED boards 18 that are arranged in the X-axis direction to form a row are electrically connected to each other by connecting the adjacent connector portions 18a by fitting. The connector portions 18a located at the ends of the chassis 14 in the X-axis direction are electrically connected to an external control circuit (not illustrated). Accordingly, the LEDs 17 arranged on each of the LED boards 18 that are arranged to form a row are connected in series and turning on and off of the LEDs 17 included in one row of the LED boards 18 can be controlled collectively by one control circuit. This achieves a low cost. The LED boards 18 having a different long-side dimension and the different number of LEDs 17 mounted thereon have a same short-side dimension and same arrangement intervals of the LEDs 17.

Thus, a plurality kinds of the LED boards 18 having different long-side dimensions and different number of LEDs 17 mounted thereon are prepared to be used by combining the different kinds of LED boards 18 appropriately. Accordingly, following advantageous effects can be obtained. In case of manufacturing a plurality types of liquid crystal display devices 10 having different screen sizes, it is effective to determine whether each kind of LED boards 18 is used or not and change the number of LED board 18 for each kind according to each screen size. Compared to a case in which the LED boards having a long-side dimension same as the chassis 14 that is designed exclusively for each screen size are prepared for every screen size, the kind of the LED boards 18 that is necessary for manufacturing a plurality types of liquid crystal display devices 10 having different screen sizes is decreased and this lowers a manufacturing cost.

In addition to the two kinds of LED boards 18 (the five LEDs mounted-type LED board and the six LEDs mounted-type LED board), an eight LEDs mounted-type LED board 18 having eight LEDs 17 are mounted thereon may be used. The three kinds of LED boards 18 may be combined appropriately to be used for easily manufacturing liquid crystal display devices 10 having different screen sizes of 26 inches, 32 inches, 37 inches, 40 inches, 42 inches, 46 inches, 52 inches, and 65 inches with a low cost.

As illustrated in FIG. 7, each LED board 18 is fixed to the bottom plate 14a of the chassis 14 by the holding member 20. The holding member 20 includes a disk-like shaped pressing portion 20a and a stopper portion 20b extending downwardly from the pressing portion 20a. Insertion holes 18c are formed in the Led board 18 and the stopper portion 20b is inserted through each of the insertion holes 18c. Mounting holes 14e are formed in the bottom plate 14a of the chassis 14 so as to be communicated with the corresponding insertion hole 18c. A distal end portion of the stopper portion 20b of the holding member 20 is formed to be an elastically deformable wide portion. After being inserted through the insertion hole 18c and the mounting hole 14e, the distal end portion can be stopped by the rear surface of the bottom plate 14a of the chassis 14. Accordingly, the holding member 20 fixes the LED board 18 to the bottom plate 14a with the pressing portion 20a pressing the LED board 18.

As illustrated in FIG. 2, among the holding members 20, holding members 20B that are arranged in a middle portion of the bottom plate 14a of the chassis 14 have supporting pins 27. The supporting pin 27 projects from a surface of each supporting member 20B. The supporting pin 27 is formed to be tapered so as to be thinner toward the front-surface side and formed in a conical shape with a round tip end. If the diffuser 15a is warped downwardly, the diffuser 15a comes in point contact with the distal end of the support pin 27. Accordingly, the diffuser 15a is supported from the lower side by the support pins 27 and the uneven brightness is less likely to be caused by the warping of the diffuser 15a. The holding members 20 having no supporting pin 27 is represented by "20A".

The chassis reflection sheet 22 (a reflection sheet) has a size that can cover almost entire area of an inner surface of the chassis 14. The chassis reflection sheet 22 is made of a synthetic resin, and has a surface having white color that provides excellent light reflectivity. As illustrated in FIG. 3, the chassis reflection sheet 22 extends along the inner surface of the chassis 14. Almost entire area of a middle portion of the chassis reflection sheet 22 extending along the bottom plate 14a of the chassis 14 is a sheet bottom portion 31.

As illustrated in FIG. 3, the sheet bottom portion 31 is formed in substantially a rectangular shape in a plan view. Lens fitting holes 22b that are through holes are formed in the sheet bottom portion 31 such that the diffuser lens 19 included in the LED unit U is fitted therethrough. The lens fitting holes 22b are formed in a matrix so as to correspond to the arrangement of the LED unit U and the diffuser lenses 19. As illustrated in FIG. 6, each lens fitting hole 22b is formed in a circular shape with a plan view and a diameter R1 of the lens fitting hole 22b is greater than a diameter R2 of the diffuser lens 19.

With this configuration, in arranging the chassis reflection sheet 22 in the chassis 14, each diffuser lens 19 can be fitted through each lens fitting hole 22b surely even if dimension errors occur. As illustrated in FIG. 3, the chassis reflection sheet 22 covers portions between adjacent diffuser lenses 19 and outer peripheral portions of the chassis 14. Therefore, the chassis reflection sheet 22 reflects light directing toward the portions toward the optical member 15 side.

As illustrated in FIG. 3, a sheet sloped portion 32 extends from a peripheral edge (four sides) of the sheet bottom portion 31 so as to be sloped. Each sheet sloped portions 32 is lifted up so as to cover each side plate 14c of the chassis 14 (FIGS. 4, 5 and 7). A placing portion 33 extends from the marginal edge of each sheet sloped portion 32 along the receiving plates 14d. The placing portion 33 is placed on the receiving plate 14d. In other words, the sheet sloped portion 32 connects the sheet bottom portion 31 and the placing portion 33 of the chassis reflection sheet 22.

The optical member 15 is supported by the placing portions 33. The placing portions 33 are held between the chassis 14 and the optical member 15. In the present embodiment, the sheet sloped portion 32 extends from each of the four sides of the sheet bottom portion 31. However, the configuration is not limited thereto. The sheet sloped portion 32 extends from a peripheral edge of the sheet bottom portion 31 and the sheet sloped portion 32 may extend from only one side of the four sides.

The sheet sloped portion 32 is sloped toward the front-surface side (the light exit side of the backlight device 12) with respect to the sheet bottom portion 31. In the chassis reflection sheet 22 of the present embodiment, a borderline L between the chassis bottom portion 31 and the sheet sloped portion 32 is formed to have a rectangular waveform or a convex-concave shape (the borderline L is not straight). The sheet sloped portion 32 is lifted up from the borderline L.

More specifically, the sheet sloped portion 32 includes a first sheet sloped portion 32A and a second sheet sloped portion 32B each of which is lifted up from a different position. As illustrated in FIG. 3, each of the borderlines L between the first sheet sloped portion 32A and the sheet bottom portion 31 and between the second sheet sloped portion 32B and the sheet bottom portion 31 is formed along the X-axis direction or the Y-axis direction. The borderline L (L1) between the first sheet sloped portion 32A and the sheet bottom portion 31 is arranged at a inner side (in a middle portion of the chassis 14) from the borderline L (L2) between the second sheet sloped portion 32B and the sheet bottom portion 31. As illustrated in FIG. 7, an inclination angle A1 of the first sheet sloped portion 32A with respect to the sheet bottom portion 31 is set to be smaller than an inclination angle B1 of the second sheet sloped portion 32B with respect to the sheet bottom portion 31. An outward extending length of the first sheet sloped portion 32A is set to be longer than an outward extending length of the second sheet sloped portion 32B.

The first sheet sloped portion 32A and the second sheet sloped portion 32B are arranged alternately in an extending direction (the X-axis direction or the Y-axis direction) in which the peripheral edge portion of the sheet bottom portion 31 extends. The first sheet sloped portions 32A are arranged at equal intervals. The second sheet sloped portions 32B are arranged at equal intervals except for the ones arranged at the four corners of the chassis 14. The arrangement intervals of the second sheet sloped portions 32B are substantially equal to the arrangement intervals of the LED units U in the Y-axis direction. With this configuration, the connector portion 18a of the LED unit U is arranged on a rear-surface side of the second sheet sloped portion 32B (on a lower side in FIG. 7). The arrangement intervals of the first sheet sloped portions 32A and the second sheet sloped portions 32B are not limited to this configuration but may be altered if necessary. A connecting portion 32C formed in a triangular shape with a side view is formed to connect the first sheet sloped portion 32A and the second sheet sloped portion 32B (fill a space formed between the two components 32A and 32B).

Figure 9:
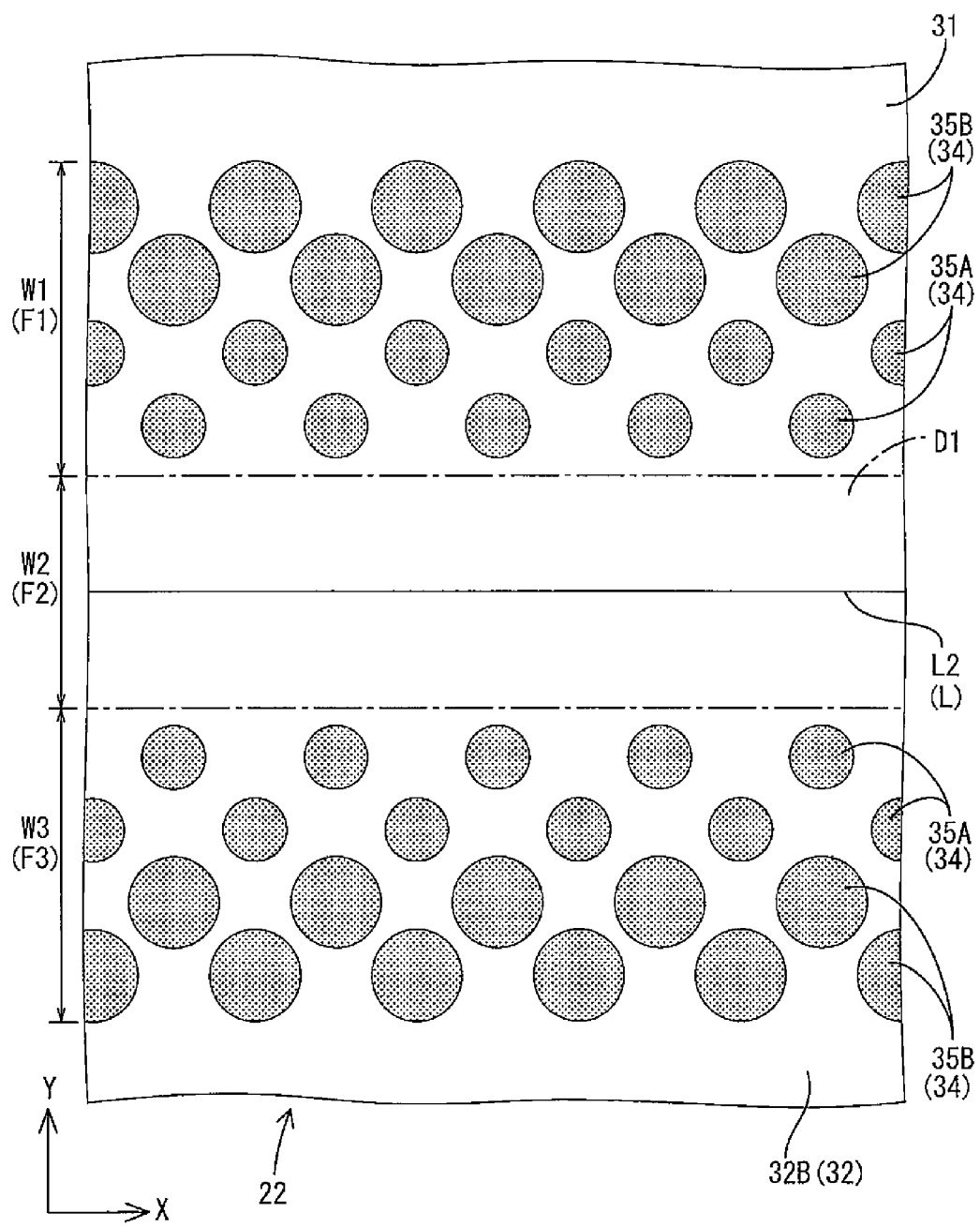
FIG. 9 is a general view illustrating a light reflectance distribution of the chassis reflection sheet in FIG. 3.
Figure 10:
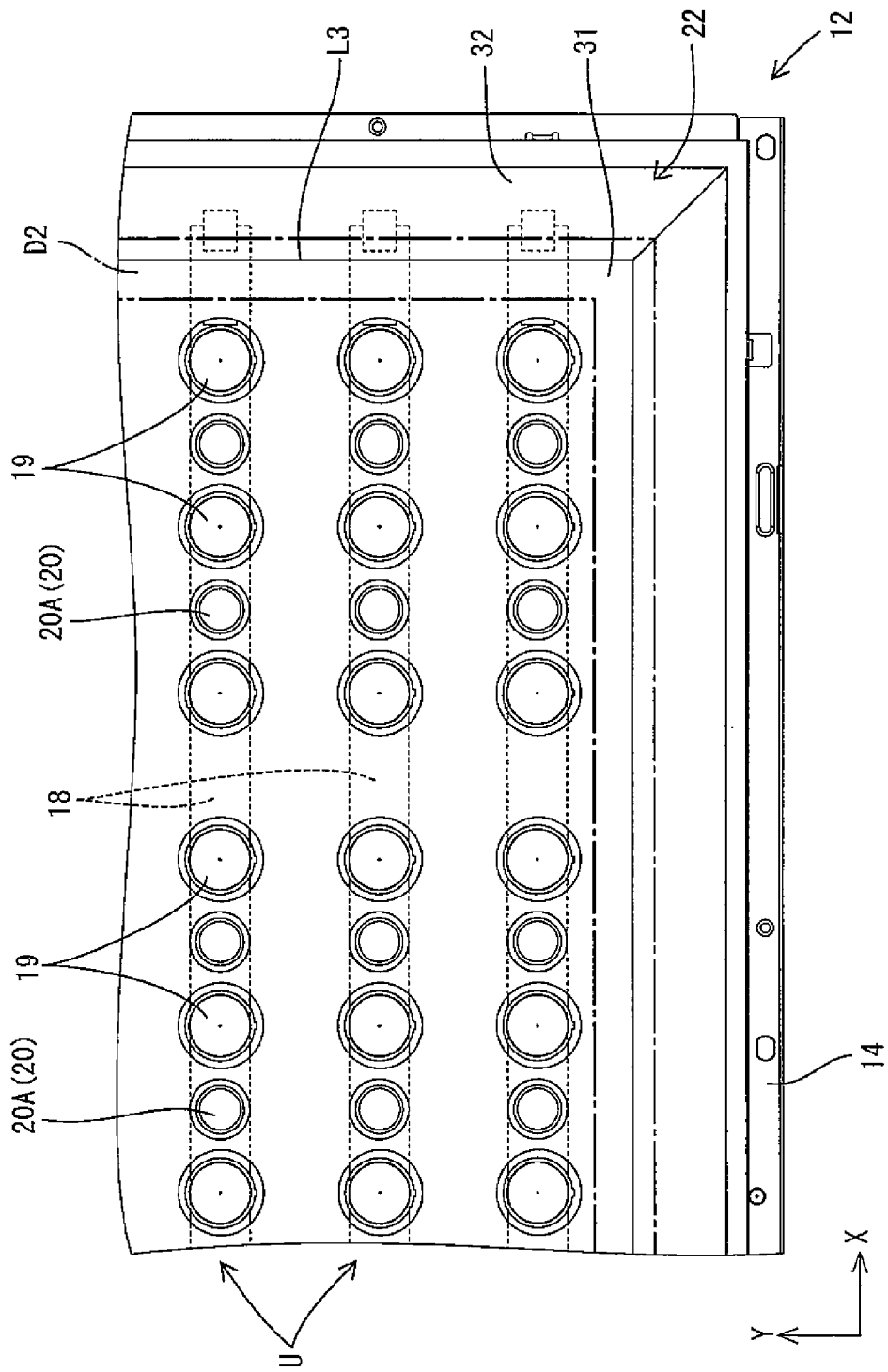
FIG. 10 is an enlarged view illustrating a comparative example.

On a front surface of the chassis reflection sheet 22 of the present embodiment, light reflectance is different in an area extending along the borderline L (a border portion F2) between the sheet sloped portion 32 and the sheet bottom portion 31 and in an area adjacent to the border portion F2 (adjacent portions F1, F3). The light reflectance of the chassis reflection sheet 22 will be explained in detail with reference to FIG. 9. FIG. 9 is an enlarged general view illustrating a part of the front surface of the chassis reflection sheet 22 that is in adjacent to the borderline L between the sheet sloped portion 32 and the sheet bottom portion 31. In FIG. 9, the portion in adjacent to the borderline L2 (L) between the second sheet sloped portion 32B and the sheet bottom portion 31 and an upper side in FIG. 9 corresponds to an inner side of the chassis 14 and a lower side in FIG. 9 corresponds to an outer side of the chassis 14.

The border portion F2 includes an area of the front surface of the chassis reflection sheet 22 that extends along the borderline L (L2) and includes the borderline L (L2). In the present embodiment, the border portion F2 includes an area of the front surface of the chassis reflection sheet 22 so as to have a certain width W2 from the borderline L (L2) that is set as a center.

Each of the adjacent portions F1, F3 is provided on a side far away from the borderline L (on an upper side and a lower side of the borderline L in FIG. 9) with respect to the border portion F2. In the present embodiment, the adjacent portion F1 corresponds to an area having a certain width W1 from the border portion F2 to the upper side in FIG. 9 from the borderline L (to the inner side of the chassis reflection sheet 22). The adjacent portion F3 corresponds to an area having a certain width W3 from the border portion F2 to the lower side in FIG. 9 from the borderline L (to the outer side of the chassis reflection sheet 22). In other words, each of the border portion F2 and the adjacent portions F1, F3 extends along the borderline L and is formed in substantially a rectangular waveform corresponding to the shape of the borderline L in a plan view. FIG. 9 illustrates an enlarged part of the borderline L having a rectangular waveform that is a part of a line segment configuring the rectangular waveform. The adjacent portions F1, F3 are provided to sandwich the border portion F2 in a direction perpendicular to a direction along the borderline L.

Each of the border portion F2 and the adjacent portions F1, F3 is not necessarily formed to correspond to the shape of the borderline L (the rectangular waveform in the present embodiment) but may be a rectangular area (an area along a partial line segment of the borderline L) extending along the borderline L (a right-and-left direction in FIG. 9). Each of the widths W1-W3 of the border portion F2 and the adjacent portions F1, F3 may be altered if necessary.

The light reflectance is set to be higher in the border portion F2 than in the adjacent portions F1, F3. As illustrated in FIG. 9, a light reflecting portion 34 of a dot pattern is formed in the adjacent portions F1, F3 on a front surface (the light exit side) of the chassis reflection sheet 22. Each dot 35 (35A or 35B) of the light reflecting portion 34 is formed to be circular in a plan view, for example, and the light reflectance of the dot is set to be lower than that of the chassis reflection sheet 22. Each dot 35 is formed by printing white paste on a surface of the chassis light reflection sheet 22, for example. Preferable printing methods include serigraph, ink jet printing or screen printing. Each dot 35 may be formed to have any shape other than a circle in a plan view.

Thus, the light reflecting portion 34 having light reflectance lower than the chassis reflection sheet 22 is formed on the adjacent portions F1, F3. Accordingly, the light reflectance of the adjacent portions F1, F3 is configured to be lower than that of the border portion F2 (that is the light reflectance of the chassis reflection sheet 22), and in other words, the light reflectance of the border portion F2 is configured to be higher than that of the adjacent portions F1, F3.

An area of each dot 35 of the light reflecting portion 34 is varied to change the light reflectance in the adjacent portions F1, F3. As described before, the light reflectance of the dot 35 is set to be lower than that of the chassis reflection sheet 22. Therefore, an area of each dot 35 of the light reflecting portion 34 is increased so as to lower the light reflectance of an area in which the light reflecting portion 34 is formed compared to the light reflectance of the chassis reflection sheet 22.

Specifically, among the dots 35 formed in the adjacent portions F1, F3, an area of each dot 35A formed close to the borderline L2 is greater than an area of each dot 35B formed far away from the borderline L2. Accordingly, in the adjacent portions F1, F3, the light reflectance is lowered as is farther away from the borderline L. In the present embodiment, two kinds of dots 35A, 35B are formed to lower the light reflectance as is farther away from the borderline L. However, the configuration is not limited thereto. For example, three or more kinds of dots may be formed such that an area of each dot increases in a stepwise manner as is farther away from the borderline L.

An area of each dot 35 of the light reflecting portion 34 is varied to control the light reflectance in the adjacent portions F1, F3. However, a control method is not limited thereto. For example, intervals between the dots 35 maybe changed to control the light reflectance. In such a case, if the intervals between the dots 35 increase, a distribution density of the dots 35 becomes smaller and this relatively increases the light reflectance. FIG. 9 illustrates a configuration of the light reflecting portion 34 in adjacent to the borderline L2 between the second sheet sloped portion 32B and the sheet bottom portion 31. A configuration of the light reflecting portion 34 in adjacent to the borderline L1 between the first sheet sloped portion 32A and the sheet bottom portion 31 is similar to the configuration in FIG. 9 (the light reflectance decreases as is farther away from the borderline L).

Next, advantageous effects of the configuration of the present embodiment will be explained. First, problems that may be caused by the configuration of the present embodiment will be explained. In the present embodiment, the chassis reflection sheet 22 includes the sheet bottom portion 31 and the sheet sloped portion 32. FIG. 7 illustrates rays of light (a dashed-dotted line) exited from each LED 17 in the peripheral edge portions of the sheet bottom portion 31. As illustrated in FIGS. 3 and 7, the borderline between the sheet bottom portion 31 and the sheet sloped portion 32 of the chassis reflection sheet 22 is farther away from each LED 17 than a portion in the middle portion of the chassis 14. Therefore, the rays of light exited from the LED 17 is less likely to reach the borderline L and an amount of light reaching the border L is relatively small.

As described before, the emission intensity of the LED 17 is significantly high along the light axis E1 (exit light along the light axis is represented by an arrow E1 in FIG. 7) and sharply decreases as the angle to the light axis E1 increases. Light exited from the LED 17 and reaching the distal end portion of the sheet sloped portion 32 has a relatively small angle with respect to the light axis E1. Light exited from the LED 17 and reaching a portion adjacent to the borderline L has a greater angle (approximately 90 degrees) with respect to the light axis E1. The amount of rays of light exited from the LED 17 and reaching the portion adjacent to the borderline L is relatively smaller than the distal end portion of the sheet sloped portion 32. The rays of light reaching the distal end portion of the sheet sloped portion 32 are represented by arrows E2 in FIG. 7.

Accordingly, the amount of rays of light reaching the border portion F2 of the chassis reflection sheet 22 that is adjacent to the border line L between the sheet bottom portion 31 and the sheet sloped portion 32 is relatively smaller than surrounding portions of the border portion F2. Therefore, if the light reflectance of the chassis reflection sheet 22 is set to be constant in an entire area thereof, the amount of rays of light reflected by the chassis reflection sheet 22 is reduced in the border portion F2. As a result, dark portions are likely to be generated in the border portion F2 than in the surrounding portions (the adjacent portions F1, F3) and this may cause uneven brightness.

Therefore, the light reflectance is higher in the border portion F2 than in the adjacent portions F1, F3 on the chassis reflection sheet 22. The high light reflectance increases the amount of reflected light and this improves brightness. With such a configuration, brightness of the border portion F2 receiving less amount of light exited from the LED 17 is less likely to be lower than the brightness of the adjacent portions F1, F3, and the border portion F2 is less likely to be recognized as a dark portion.

The light reflectance becomes lower on the surface of the chassis reflection sheet 22 close to the LED 17, as is farther away from the borderline L. With such a configuration, the brightness does not abruptly changes between the adjacent portions F1, F3 and the border portion F2 that have different light reflectance. Therefore, uneven brightness is less likely to occur.

The light reflecting portion 34 having light reflectance lower than the chassis reflection sheet 22 is formed on the adjacent portions F1, F3. With such a configuration, the light reflectance of the adjacent portions F1, F3 is set to be lower than that of the border portion F2 (equal to the light reflectance of the chassis reflection sheet 22). That is, the light reflectance of the border portion F2 is higher than that of the adjacent portions F1, F3.

To achieve a configuration that the light reflectance of the border portion F2 is higher than that of the adjacent portions F1, F3, the chassis reflection sheet 22 having constant light reflectance is prepared and a light reflecting portion having light reflectance higher than the chassis reflection sheet 22 may be formed on the border portion F2. However, the chassis reflection sheet 22 generally has high light reflectance to improve light use efficiency. Therefore, it is difficult to set the light reflectance of only the border portion F2 on the chassis reflection sheet 22 that originally has high light reflectance to be higher than the adjacent portions F1, F3. In the present embodiment, the light reflecting portion 34 having light reflectance lower than the chassis reflection sheet 22 is formed on the adjacent portions F1, F3 to lower the light reflectance of the adjacent portions F1, F3. This easily achieves a configuration that the light reflectance is higher in the border portion F2 than in the adjacent portions F1, F3.

The light reflecting portion is configured with a dot pattern. Therefore, a pattern of each dot 35 (such as an area and arrangement intervals) is varied to easily control the light reflectance of the light reflecting portion 34.

Next, advantageous effects of the configuration that the borderline L between the sheet bottom portion 31 and the sheet sloped portion 32 is formed to have a rectangular waveform in a plan view will be explained. As described before, the portion (the border portion F2) along the borderline L between the sheet bottom portion 31 and the sheet sloped portion 32 is likely to be a dark portion. As illustrated in a comparative example in FIG. 10, if a borderline L3 between the sheet bottom portion 31 and the sheet sloped portion 32 is formed to be linear, a dark portion D2 (an area illustrated by dashed-dotted lines in FIG. 10) is also formed in a linear shape corresponding to the shape of the borderline L3. If the dark portion D2 is linear, a border between the dark portion D2 and its surrounding portions is clear and this easily causes uneven brightness.

In the present embodiment, the borderline L is formed in a rectangular waveform in a plan view (is not formed in a linear shape). Therefore, if the border portion F2 becomes a dark portion D1 (an area illustrated by dashed dotted lines in FIG. 8), the dark portion D1 has a non-linear shape in a plan view. Compared to the linear dark portion, in a configuration that the dark portion D1 is not formed in a linear shape, the border between the dark portion D1 and its surrounding portions is unclear and uneven brightness is less likely to be caused. As described before, in the backlight device 12 of the present embodiment, the light reflectance is varied in the border portion F2 and in the adjacent portions F1, F3 and the borderline L has a non-linear shape. This achieves high display quality.

The borderline L formed in a rectangular waveform is easily formed compared to the one formed in other non-linear shapes (for example, a curved line shaped in a sinusoidal waveform). To form the borderline L in a curved line, the sloped surface of the sheet sloped portion 32 is also required to be formed in a curved surface and this may cause uneven brightness. In the present embodiment, the borderline L is formed in a rectangular waveform. With this configuration, the surface of the sheet sloped portion 32 includes only plane surfaces and this may not cause uneven brightness.

The sheet bottom portion is formed in substantially a rectangular shape in a plan view and the sheet sloped portion extends from each of surrounding four sides of the sheet bottom portion.

The LED 17 (light emitting diode) is used as the light source. This lowers consumption power.

The diffuser lens 19 is provided to cover the LED 17. The diffuser lens 19 diffuses light from the LED 17. With this configuration, light from the LED 17 is diffused by the diffuser lens 19 and arrangement intervals between the LEDs is increased (the number of LEDs is reduced) and even brightness is achieved.

<Second Embodiment>

Figure 11:
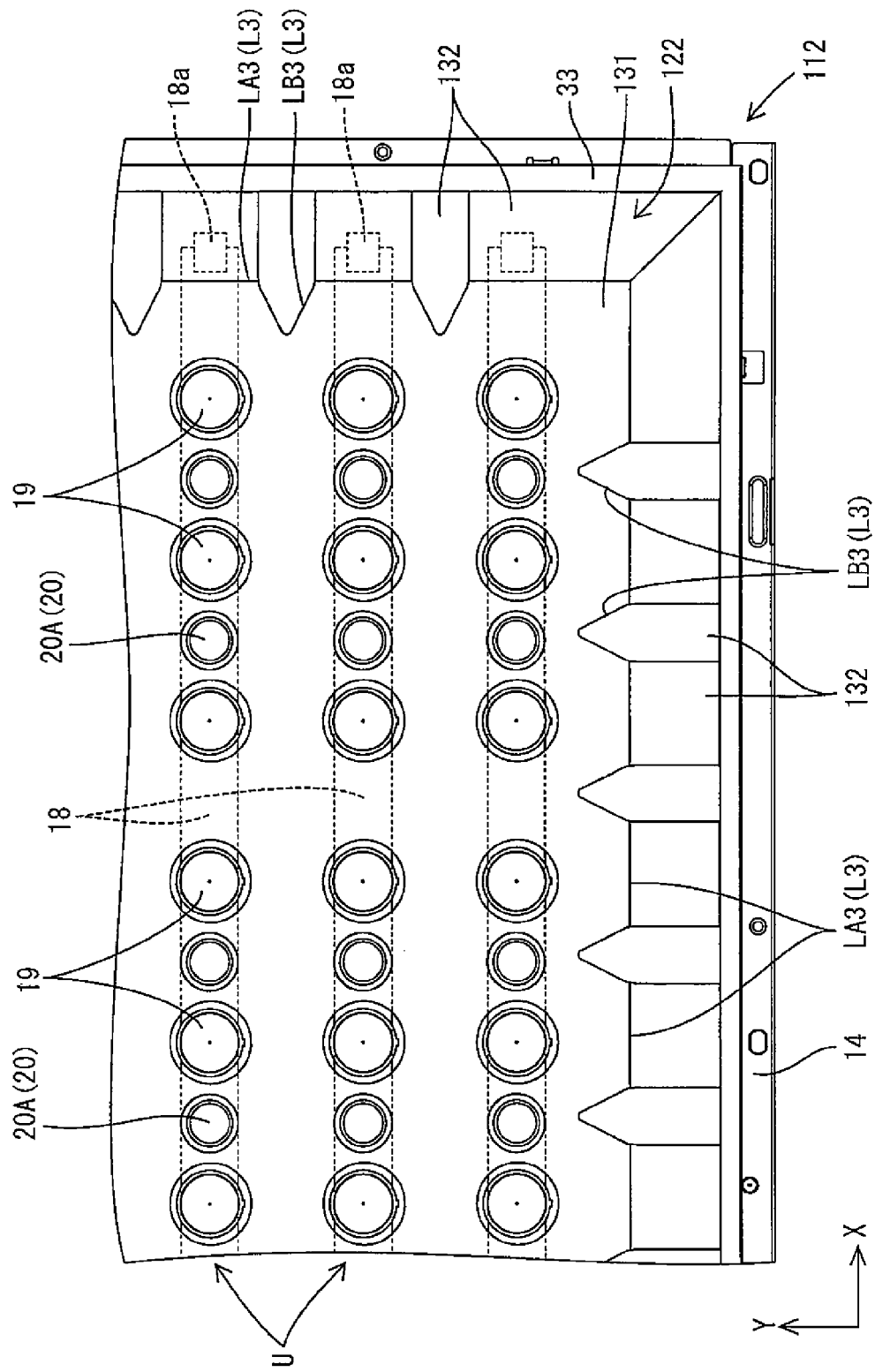
FIG. 11 is an enlarged view illustrating a peripheral part of a chassis reflection sheet according to a second embodiment of the present invention.

A second embodiment of the present invention will be explained with reference to FIG. 11. Same symbols or numerals are applied to components of the second embodiment same as those in the first embodiment and explanation thereof will be omitted. In a backlight device 112 of the second embodiment, a borderline L3 between a bottom portion 131 and a sloped portion 132 of a chassis reflection sheet 122 is formed in a shape different from the borderline in the first embodiment. The borderline L3 is configured with linear portions LA3 and projected portions LB3. Each of the linear portions LA3 is formed in a straight linear shape. Each of the projected portions LB3 is formed by projecting a part of the sloped portion 132 toward an inner side of the chassis 14. The linear portion LA3 and the projected portion LB3 are arranged alternately to form a non-linear shape as a whole. Operations and advantageous effects of the non-linear borderline L3 are same as those of the first embodiment and will not be explained.

In the present embodiment, each of the bottom portion 131 and the sloped portion 132 is configured with a separate component. Therefore, compared to a configuration that the bottom portion 131 and the sloped portion 132 are integrally formed (for example, the chassis reflection sheet 122 is bent to form the bottom portion 131 and the sloped portion 132), the chassis reflection sheet 122 having a non-linear borderline is easily formed.

<Other Embodiments>

As describe above, the embodiments of the present invention have been described. However, the present invention is not limited to the above embodiments described in the above description and the drawings. The following embodiments are also included in the technical scope of the present invention, for example.

(1) Each of the border portion F2 and the adjacent portions F1, F3 is not limited to the area described in the above embodiments. The border portion F2 is required to include the borderline L between the bottom portion 31 and the sheet sloped portion 32 and an area along the borderline L on a surface of the chassis reflection sheet 22 close to the LEDs 17 and the area of the border portion F2 (an area and a shape) may be varied if necessary. The adjacent portions F1, F3 are required to be provided in adjacent to the border portion F2 and on a side far away from the borderline L and the area of the adjacent portions F1, F3 (an area and a shape) may be varied if necessary.

(2) In the above embodiments, the light reflectance is varied in the border portion F2 and in the adjacent portions F1, F3 and the borderline L is formed in a non-linear shape. However, the configuration is not limited thereto. For example, the light reflectance may be varied in the border portion F2 and in the adjacent portions F1, F3 and the borderline L (L3) may be formed in a linear shape (see FIG. 10).

(3) In the above embodiments, the light reflecting portion 34 having light reflectance lower than the chassis reflection sheet 22 is formed in the adjacent portions F1, F3 and this achieves a configuration that the light reflectance of the border portion F2 is higher than that of the adjacent portions F1, F3. However, the configuration is not limited thereto. A light reflecting portion having light reflectance higher than the chassis reflection sheet 22 may be formed in the border portion F2 so as to achieve a configuration that the light reflectance of the border portion F2 is higher than that of the adjacent portions F1, F3.

(4) In the above embodiments, the light reflecting portion 34 formed in the adjacent portions F1, F3 is configured with a dot pattern. However, the configuration is not limited thereto. For example, portions corresponding to the adjacent portions F1, F3 may be formed of separate components having light reflectance lower than the chassis reflection sheet 22 to form the light reflecting portion 34. A light reflection sheet having light reflectance lower than the chassis reflection sheet 22 may be provided on each of the adjacent portions F1, F3 to form the light reflecting portion 34.

(5) In the above embodiments, on a surface of the chassis reflection sheet 22 close to the LEDs 17, the light reflectance reduces as is farther away from the borderline L. However, the configuration is not limited thereto. The light reflectance of the border portion F2 is set to be higher than that of the adjacent portions F1, F3. The light reflectance of the border portion F2 may be set to be higher than that of one of the adjacent portions F1 and F3.

(6) In the above embodiments, the borderline (L or L3) between the bottom portion and the sloped portion of the chassis reflection sheet is formed in a rectangular waveform or a non-linear shape including the projected portions LB3. However, the configuration is not limited thereto. The non-linear borderline may be formed in any shape other than the above shapes.

(7) In the above embodiments, the LED 17 is used as the light source. However, the configuration is not limited thereto. A light source other than the LED may be used. For example, a cathode tube may be used as the light source.

(8) In the above embodiments, the LED board 18 is arranged such that a long-side direction thereof matches the X-axis direction. However, the configuration is not limited thereto. For example, the LED board 18 may be arranged such that the long-side direction thereof matches the Y-axis direction.

(9) In the above embodiments, TFTs are used as switching components of the liquid crystal display device. However, the technology described above can be applied to liquid crystal display devices including switching components other than TFTs (e.g., thin film diode (TFD)). Moreover, the technology can be applied to not only color liquid crystal display devices but also black-and-white liquid crystal display devices.

(10) In the above embodiments, the liquid crystal display device including the liquid crystal panel is used as a display panel. The technology can be applied to display devices including other types of display components.

(11) In the above embodiments, the television receiver including the tuner is used. However, the technology can be applied to a display device without a tuner.

EXPLANATION OF SYMBOLS

10: Liquid crystal display device (Display device), 11: Liquid crystal panel (Display panel), 12, 112: Backlight device (Lighting device), 14: Chassis, 14a: Bottom plate (Bottom plate of the chassis), 17: LED (Light source), 19: Diffuser lens, 22: Chassis reflection sheet (Reflection sheet), 31: Sheet bottom portion, 32: Sheet sloped portion, 34: Light reflecting portion, F1, F3: Adjacent portion, F2: Border portion, L, L1, L2, L3: Borderline, TV: television receiver

The invention claimed is:

1. A lighting device comprising:
a light source;
a chassis including a bottom plate and housing the light source on the bottom plate; and
a reflection sheet provided on an inner surface side of the chassis and configured to reflect light from the light source, the reflection sheet including a sheet bottom portion and a sheet sloped portion, the sheet bottom portion extending along a surface of the bottom plate and the sheet sloped portion extending from a peripheral edge of the sheet bottom portion, the sheet sloped portion being inclined with respect to the sheet bottom portion toward a light exit side of the lighting device, wherein:
the reflection sheet has a surface that is close to the light source and the reflection sheet includes a border portion and an adjacent portion;
the border portion includes a borderline between the sheet bottom portion and the sheet sloped portion and an area along the borderline, and the adjacent portion is provided close to the border portion and on a side far away from the borderline; and
light reflectance is higher in the border portion than in the adjacent portion on the surface of the reflection sheet.

2. The lighting device according to claim 1, wherein the light reflectance of the surface of the reflection sheet close to the light source reduces as is farther away from the borderline.

3. The lighting device according to claim 1, further comprising a light reflecting portion provided in the adjacent portion and having light reflectance lower than light reflectance of the reflection sheet.

4. The lighting device according to claim 3, wherein the light reflecting portion is configured with a dot pattern.

5. The lighting device according to claim 1, wherein the border between the sheet bottom portion and the sheet sloped portion is formed in a non-linear shape in a plan view.

6. The lighting device according to claim 5, wherein the border between the sheet bottom portion and the sheet sloped portion is formed in a rectangular waveform in a plan view.

7. The lighting device according to claim 1, wherein:
the sheet bottom portion is formed in substantially a rectangular shape in a plan view and has four sides; and
the sheet sloped portion includes a plurality of sheet sloped portions, and each of the sheet sloped portions extends from each of the four sides.

8. The lighting device according to claim 1, wherein the light source is a light emitting diode.

9. The lighting device according to claim 1, further comprising a diffuser lens provided to cover the light source and configured to diffuse light from the light source.

10. The lighting device according to claim 1, wherein the light source includes a plurality of light sources and the light sources are arranged along the bottom plate of the chassis in a matrix.

11. A display device comprising:
the lighting device according to claim 1; and
a display panel configured to provide display using light from the lighting device.

12. The display device according to claim 11, wherein the display panel is a liquid crystal panel using liquid crystals.

13. A television receiver comprising the display device according to claim 11.

* * * * *